United States Patent
Zhang

(10) Patent No.: US 8,890,974 B2
(45) Date of Patent: *Nov. 18, 2014

(54) METHODS AND SYSTEMS FOR AUTOMATIC WHITE BALANCE

(71) Applicant: Texas Instruments Incorporated, Dallas, TX (US)

(72) Inventor: Buyue Zhang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/013,752

(22) Filed: Aug. 29, 2013

(65) Prior Publication Data

US 2013/0342725 A1     Dec. 26, 2013

Related U.S. Application Data

(62) Division of application No. 12/710,344, filed on Feb. 22, 2010, now Pat. No. 8,547,450.

(51) Int. Cl.
*H04N 9/73* (2006.01)
(52) U.S. Cl.
CPC .................................. *H04N 9/735* (2013.01)
USPC ...................... 348/223.1; 348/222.1; 348/187
(58) Field of Classification Search
CPC .................................................. H04N 5/2356
USPC .......... 348/223.1, 222.1, 224.1, 226.1, 227.1, 348/228.1, 187, 188, 162, 167, 169, 254, 348/674; 382/274, 162–172; 358/518, 519, 358/520, 522; 345/600, 603, 604
See application file for complete search history.

(56) References Cited

U.S. PATENT DOCUMENTS

| | | | | |
|---|---|---|---|---|
| 2003/0052978 A1* | 3/2003 | Kehtarnavaz et al. | ..... | 348/223.1 |
| 2004/0017594 A1* | 1/2004 | Suekane et al. | ............... | 358/516 |
| 2007/0064119 A1* | 3/2007 | Komiya et al. | ............ | 348/222.1 |
| 2007/0133071 A1* | 6/2007 | Noyes et al. | .................. | 358/516 |

* cited by examiner

*Primary Examiner* — Tuan Ho
(74) *Attorney, Agent, or Firm* — Mirna Abyad; W. James Brady; Frederick J. Telecky, Jr.

(57) ABSTRACT

A method for calibrating automatic white balance (AWB) in a digital system is provided that includes capturing an image of a test target under a natural lighting condition, generating a first color temperature reference from the captured image, and outputting AWB configuration data for the digital system, wherein the AWB configuration data comprises the first color temperature reference and a second color temperature reference generated using the test target under simulated lighting conditions. A method for calibrating automatic white balance (AWB) in a digital system comprising a first imaging sensor is provided that includes receiving a reference for AWB that was generated using an image captured using a second imaging sensor, and compensating a histogram reference into a histogram reference for AWB for the first imaging sensor in the digital system based on R, G, B adjustment values from the second imaging sensor to the first imaging sensor.

15 Claims, 7 Drawing Sheets

METHODS AND SYSTEMS FOR AUTOMATIC WHITE BALANCE

CROSS-REFERENCE TO RELATED APPLICATIONS

This application is a divisional application of United Stated patent application Ser. No. 12/710,344 filed Feb. 22, 2012 and is related to U.S. patent application Ser. No. 12/510,853, filed Jul. 28, 2009, and U.S. patent application Ser. No. 12/700,671, filed Feb. 4, 2010, all of which are incorporated by reference herein in their entirety.

BACKGROUND OF THE INVENTION

White balance is the process of removing unrealistic color cast from a digital image caused by the color of the illumination. Human eyes automatically adapt to the color of the illumination, such that white will always appear white. Unfortunately, image capture devices (e.g., camera sensors) cannot adapt automatically. Therefore, white balance techniques are needed for imaging sensors in image capture systems (e.g., a digital camera) to compensate for the effect of illumination.

Automatic white balance (AWB) is an essential part of the imaging system pipeline in image capture systems. Digital still cameras and camera phones, for example, apply AWB techniques to correctly display the color of digital images. The performance of AWB has been a differentiating factor for different camera brands.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
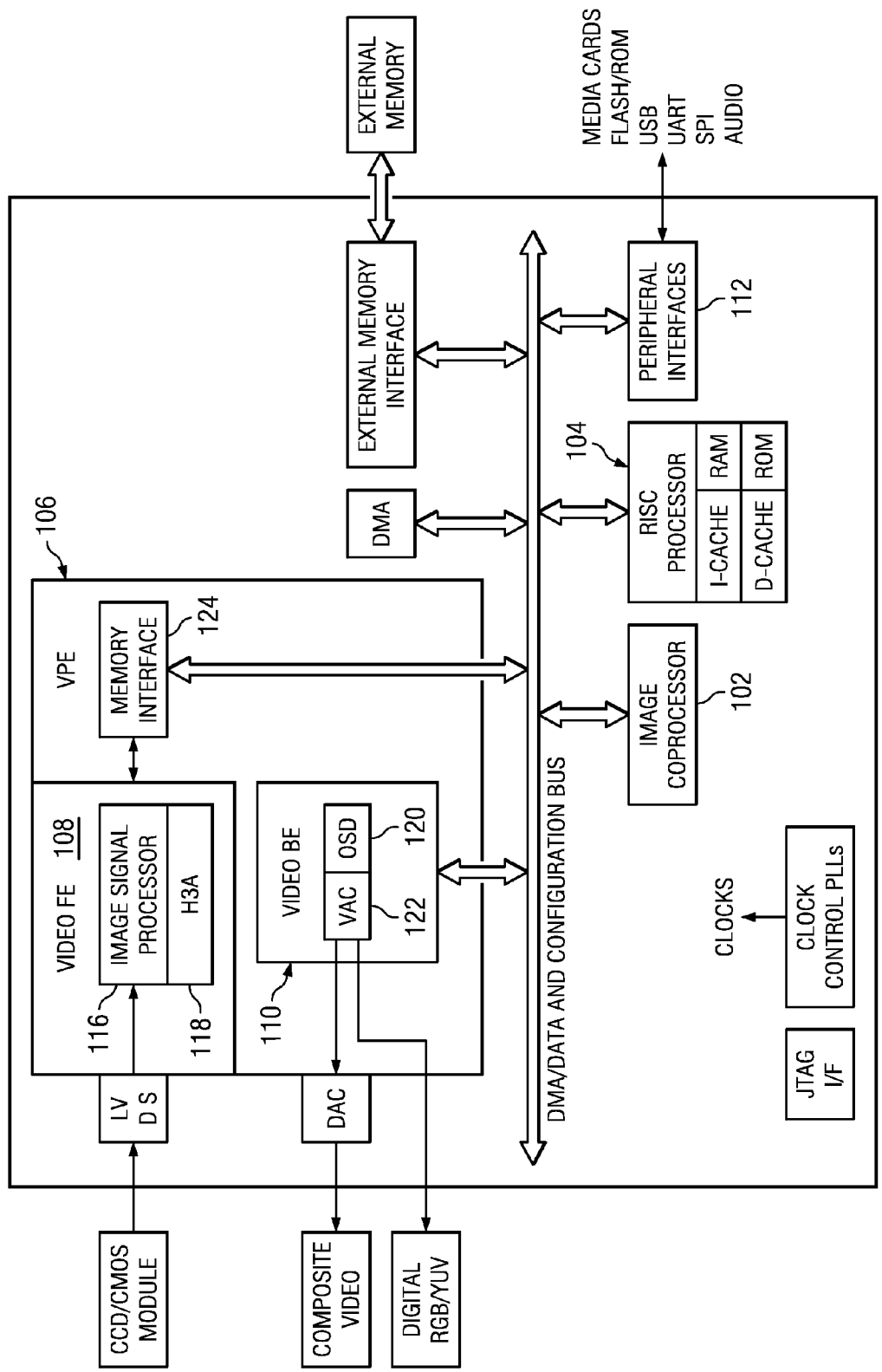
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless connection. Thus, if a first device or component couples to a second device or component, that connection may be through a direct connection, through an indirect connection via other devices and connections, through an optical connection, and/or through a wireless connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, combined, and/or performed in a different order than the order shown in the figures and/or described herein. Accordingly, embodiments of the invention should not be considered limited to the specific ordering of steps shown in the figures and/or described herein.

In general, embodiments of the invention provide methods and systems for automatic white balance in digital systems that capture digital images. A digital image is a block of pixels such as single photograph, a subset of a photograph, a frame (or other subset) of a digital video sequence, etc. In one or more embodiments of the invention, a digital system that is configured to capture photographs and/or video sequences implements an automatic white balance (AWB) method that is calibrated with references generated by an embodiment of an AWB calibration method. The references may include references generated using a test target (e.g., a color checker) captured at different color temperatures under simulated and/or natural lighting conditions, i.e., color temperature references, and/or references generated using scene prototypes, i.e., scene prototype references. A reference may include statistics (e.g., a histogram) of an image used to generate the reference and/or one or more gray values (e.g., R, G, B, and/or their corresponding chromaticity values (e.g., Cb, Cr) extracted from gray areas in an image). Methods for generation of scene prototype references are described in U.S. patent application Ser. No. 12/700,671.

In some embodiments of the invention, the AWB method is an embodiment of the method described in U.S. patent application Ser. No. 12/510,853. In general, embodiments of the AWB method compare the statistics (e.g., a histogram) of an image to the statistics of the references (e.g., using histogram correlation) to determine which reference best matches the image, i.e., has the closest color temperature, and then estimate the gray values for the color temperature of the selected reference to perform white balance correction on the image.

U.S. patent application Ser. No. 12/510,853 provides more detailed descriptions of AWB method embodiments.

In one or more embodiments of the invention, reference histograms are adjusted prior to use in AWB to compensate for variations in individual imaging sensor characteristics to achieve higher accuracy in AWB. For example, in some embodiments of the invention, the AWB references that include histograms are first generated using an imaging sensor that exhibits typical characteristics of the model of imaging sensor to be used in the manufacture of a digital system. This typical imaging sensor is often referred to as a "Golden Sample." However, in mass production, each individual imaging sensor, although of the same model as the Golden Sample, may have characteristics that vary from those of the Golden Sample. Thus, the histograms in the AWB references need to be adjusted (i.e., compensated) for each individual imaging sensor.

FIG. 1 shows a digital system suitable for an embedded system (e.g., a digital camera) in accordance with one or more embodiments of the invention that includes, among other components, a DSP-based image coprocessor (ICP) (102), a RISC processor (104), and a video processing engine (VPE) (106) that may be configured to perform an AWB method as described herein. The RISC processor (104) may be any suitably configured RISC processor. The VPE (106) includes a configurable video processing front-end (Video FE) (108) input interface used for video capture from imaging peripherals such as imaging sensors, video decoders, etc., a configurable video processing back-end (Video BE) (110) output interface used for display devices such as SDTV displays, digital LCD panels, HDTV video encoders, etc, and memory interface (124) shared by the Video FE (108) and the Video BE (110). The digital system also includes peripheral interfaces (112) for various peripherals that may include a multimedia card, an audio serial port, a Universal Serial Bus (USB) controller, a serial port interface, etc.

The Video FE (108) includes an image signal processor (ISP) (116), and an H3A statistic generator (H3A) (118). The ISP (116) provides an interface to imaging sensors and digital video sources. More specifically, the ISP (116) may accept raw image/video data from a sensor module (126) (e.g., CMOS or CCD) and can accept YUV video data in numerous formats. The ISP (116) also includes a parameterized image processing module with functionality to generate image data in a color format (e.g., RGB) from raw CCD/CMOS data. The ISP (116) is customizable for each sensor type and supports video frame rates for preview displays of captured digital images and for video recording modes. The ISP (116) also includes, among other functionality, an image resizer, statistics collection functionality, and a boundary signal calculator. The H3A module (118) includes functionality to support control loops for auto focus, auto white balance, and auto exposure by collecting metrics on the raw image data from the ISP (116) or external memory. In one or more embodiments of the invention, the Video FE (108) is configured to perform one or more AWB methods as described herein. In some embodiments of the invention, the Video FE (108) is configured to perform a method to compensate histograms in AWB references prior to use in AWB as described herein.

The Video BE (110) includes an on-screen display engine (OSD) (120) and a video analog encoder (VAC) (122). The OSD engine (120) includes functionality to manage display data in various formats for several different types of hardware display windows and it also handles gathering and blending of video data and display/bitmap data into a single display window before providing the data to the VAC (122) in a color space format (e.g., RGB, YUV, YCbCr). The VAC (122) includes functionality to take the display frame from the OSD engine (120) and format it into the desired output format and output signals required to interface to display devices. The VAC (122) may interface to composite NTSC/PAL video devices, S-Video devices, digital LCD devices, high-definition video encoders, DVI/HDMI devices, etc.

The memory interface (124) functions as the primary source and sink to modules in the Video FE (108) and the Video BE (110) that are requesting and/or transferring data to/from external memory. The memory interface (124) includes read and write buffers and arbitration logic.

The ICP (102) includes functionality to perform the computational operations required for compression and other processing of captured images. The video compression standards supported may include, for example, one or more of the JPEG standards, the MPEG standards, and the H.26x standards. In one or more embodiments of the invention, the ICP (102) is configured to perform computational operations of a method for automatic white balance as described herein. In some embodiments of the invention, the ICP (102) is configured to perform computational operations of a method for compensation of histograms in AWB references as described herein.

In operation, to capture a photograph or video sequence, video signals are received by the video FE (108) and converted to the input format needed to perform video compression. Prior to the compression, a method for automatic white balance as described herein may be applied as part of processing the captured video data. Further, in some embodiments of the invention, prior to the first use of AWB (e.g., when the digital system is activated), a method for compensation of histograms in AWB references is performed to adjust the histograms for the imaging sensor used in the digital system. In some embodiments of the invention, the histograms in the AWB references are compensated for the imaging sensor using a method as described herein (e.g., during mass production or as a last step in generation of the AWB references) and the compensated references are stored on the digital system. The video data generated by the video FE (108) is stored in the external memory. The video data is then encoded, i.e., compressed. During the compression process, the video data is read from the external memory and the compression computations on this video data are performed by the ICP (102). The resulting compressed video data is stored in the external memory. The compressed video data is then read from the external memory, decoded, and post-processed by the video BE (110) to display the image/video sequence.

Figure 2:
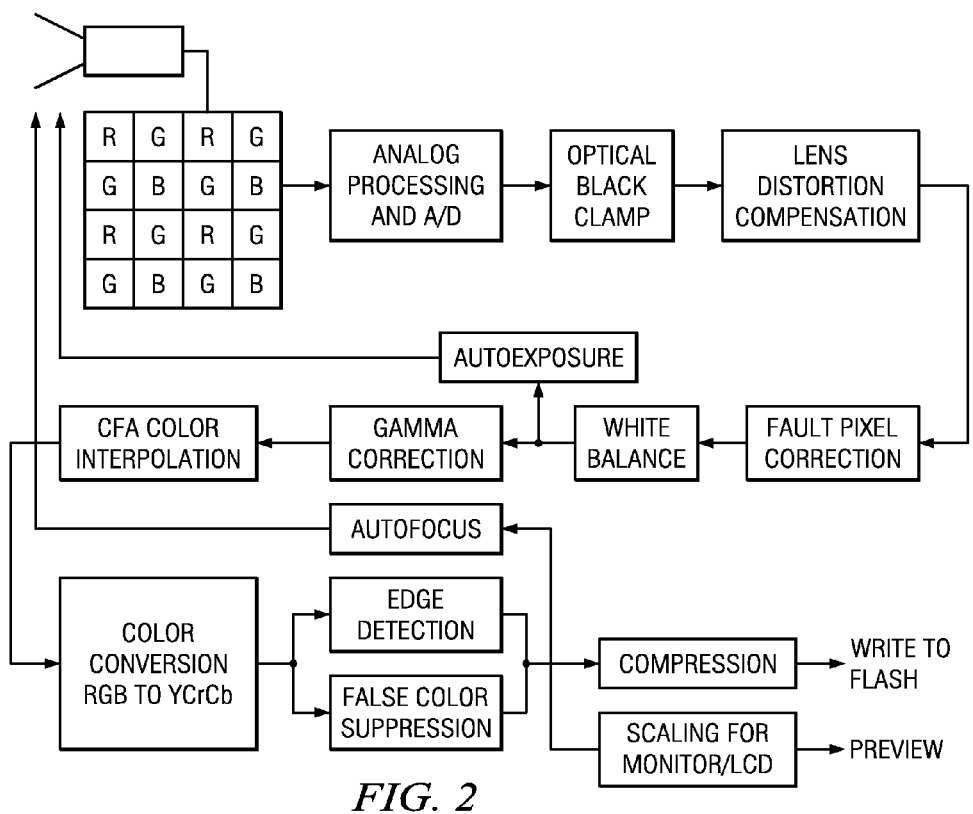
FIG. 2 shows a block diagram of an image processing pipeline in accordance with one or more embodiments of the invention.

FIG. 2 is a block diagram illustrating digital camera control and image processing (the "image pipeline") in accordance with one or more embodiments of the invention. One of ordinary skill in the art will understand that similar functionality may also be present in other digital systems (e.g., a cell phone, PDA, a desktop or laptop computer, etc.) capable of capturing digital photographs and/or digital video sequences. The automatic focus, automatic exposure, and automatic white balancing are referred to as the 3A functions; and the image processing includes functions such as color filter array (CFA) interpolation, gamma correction, white balancing, color space conversion, and compression/decompression (e.g., JPEG for single photographs and MPEG for video sequences). A brief description of the function of each block in accordance with one or more embodiments is provided below. Note that the typical color imaging sensor (e.g., CMOS or CCD) includes a rectangular array of photosites (i.e., pixels) with each photosite covered by a filter (the CFA): typically, red, green, or blue. In the commonly-used Bayer pattern CFA, one-half of the photosites are green, one-quarter are red, and one-quarter are blue.

To optimize the dynamic range of the pixel values represented by the imager of the digital camera, the pixels representing black need to be corrected since the imager still records some non-zero current at these pixel locations. The black clamp function adjusts for this difference by subtracting an offset from each pixel value, but clamping/clipping to zero to avoid a negative result.

Imperfections in the digital camera lens introduce nonlinearities in the brightness of the image. These nonlinearities reduce the brightness from the center of the image to the border of the image. The lens distortion compensation function compensates for the lens by adjusting the brightness of each pixel depending on its spatial location.

Photosite arrays having large numbers of pixels may have defective pixels. The fault pixel correction function interpolates the missing pixels with an interpolation scheme to provide the rest of the image processing data values at each pixel location.

The illumination during the recording of a scene is different from the illumination when viewing a picture. This results in a different color appearance that may be seen as the bluish appearance of a face or the reddish appearance of the sky. Also, the sensitivity of each color channel varies such that grey or neutral colors may not be represented correctly. In one or more embodiments of the invention, the white balance function compensates for these imbalances in colors in accordance with a method for automatic white balance as described herein. In some embodiments of the invention, the white balance function uses references in which histograms have been compensated in accordance with a histogram compensation method described herein.

Due to the nature of a color filter array, at any given pixel location, there is information regarding one color (R, G, or B in the case of a Bayer pattern). However, the image pipeline needs full color resolution (R, G, and B) at each pixel in the image. The CFA color interpolation function reconstructs the two missing pixel colors by interpolating the neighboring pixels.

Display devices used for image-viewing and printers used for image hardcopy have a nonlinear mapping between the image gray value and the actual displayed pixel intensities. The gamma correction function (also referred to as adaptive gamma correction, tone correction, tone adjustment, contrast/brightness correction, etc.) compensates for the differences between the images generated by the imaging sensor and the image displayed on a monitor or printed into a page.

Typical image-compression algorithms such as JPEG operate on the YCbCr color space. The color space conversion function transforms the image from an RGB color space to a YCbCr color space. This conversion may be a linear transformation of each Y, Cb, and Cr value as a weighted sum of the R, G, and B values at that pixel location.

The nature of CFA interpolation filters introduces a low-pass filter that smoothes the edges in the image. To sharpen the images, the edge detection function computes the edge magnitude in the Y channel at each pixel. The edge magnitude is then scaled and added to the original luminance (Y) image to enhance the sharpness of the image.

Edge enhancement is performed in the Y channel of the image. This leads to misalignment in the color channels at the edges, resulting in rainbow-like artifacts. The false color suppression function suppresses the color components, Cb and Cr, at the edges reduces these artifacts.

The autofocus function automatically adjusts the lens focus in a digital camera through image processing. These autofocus mechanisms operate in a feedback loop. They perform image processing to detect the quality of lens focus and move the lens motor iteratively until the image comes sharply into focus.

Due to varying scene brightness, to get a good overall image quality, it is necessary to control the exposure of the imaging sensor. The autoexposure function senses the average scene brightness and appropriately adjusting the imaging sensor exposure time and/or gain. Similar to autofocus, this operation is also in a closed-loop feedback fashion.

Most digital cameras are limited in the amount of memory available on the camera; hence, the image compression function is employed to reduce the memory requirements of captured images and to reduce transfer time.

Figure 3:
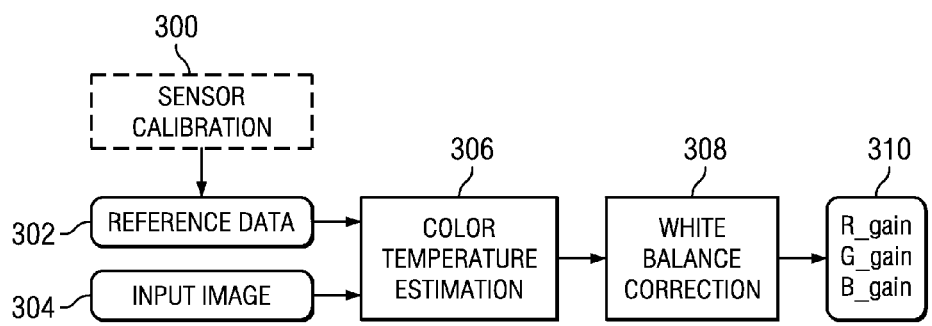
FIG. 3 shows a block diagram of automatic white balance flow in accordance with one or more embodiments of the invention.

FIG. 3 is a block diagram of AWB flow in accordance with one or more embodiments of the invention. Initially, sensor calibration is performed (300) to produce reference data (302) for calibration of an embodiment of an AWB method. The sensor calibration may be performed in accordance with an embodiment of a method for AWB calibration as described herein. As is described in more detail below, in one or more embodiments of the invention, the sensor calibration is performed using an AWB simulation system and an AWB calibration system and the resulting reference data (302) is integrated into a digital system (e.g., the digital systems of FIGS. 1, 8, and 9) implementing an embodiment of an AWB method as described herein.

In some embodiments of the invention, the reference data (302) may include references generated using a test target (e.g., a color checker) captured at different color temperatures under simulated lighting conditions and/or natural lighting conditions (i.e., color temperature references), and/or references generated using scene prototypes. Generation of references using a test target at different color temperatures under simulated lighting conditions (e.g., using a light box) is explained in more detail below in reference to FIG. 5A, generation of references using the test target in natural lighting (e.g., outdoor lighting) conditions is explained in more detail below in reference to FIG. 5B, and generation of references using scene prototypes is explained in more detail in U.S. patent application Ser. No. 12/700,671.

In one or more embodiments of the invention, histograms in the reference data (302) are adjusted prior to being used for actual white balancing to compensate for imaging sensor variation. More specifically, the reference data (302) is generated using images captured by an imaging sensor (e.g., a Golden Sample) of a particular model of imaging sensor. While the imaging sensor used to capture the reference images is representative of the particular model of imaging sensor used for capturing the input image (304), the characteristics of the actual imaging sensor used for capturing may vary from those of the imaging sensor used to generate the reference data. To provide for more accurate AWB, the histograms in the reference data (302) are adjusted to histograms for the actual imaging sensor. Methods for adjusting histograms in reference data to compensate for imaging sensor variation are described in more detail below in reference to FIGS. 7A and 7B.

The reference data (302) is then used to perform automatic white balancing on an input image (304). The automatic white balancing includes performing color temperature estimation (306) and white balance correction (308) using the reference data (302) and the input image (304). Suitable methods for color temperature estimation and white balance correction are described in U.S. patent application Ser. No. 12/510,853. The outputs of the color temperature estimation (306) and white balance correction (308) include the gains (R_gain, G_gain, B_gain) to be applied to the color channels of the image (304) to generate a white balanced image.

Figure 4A:
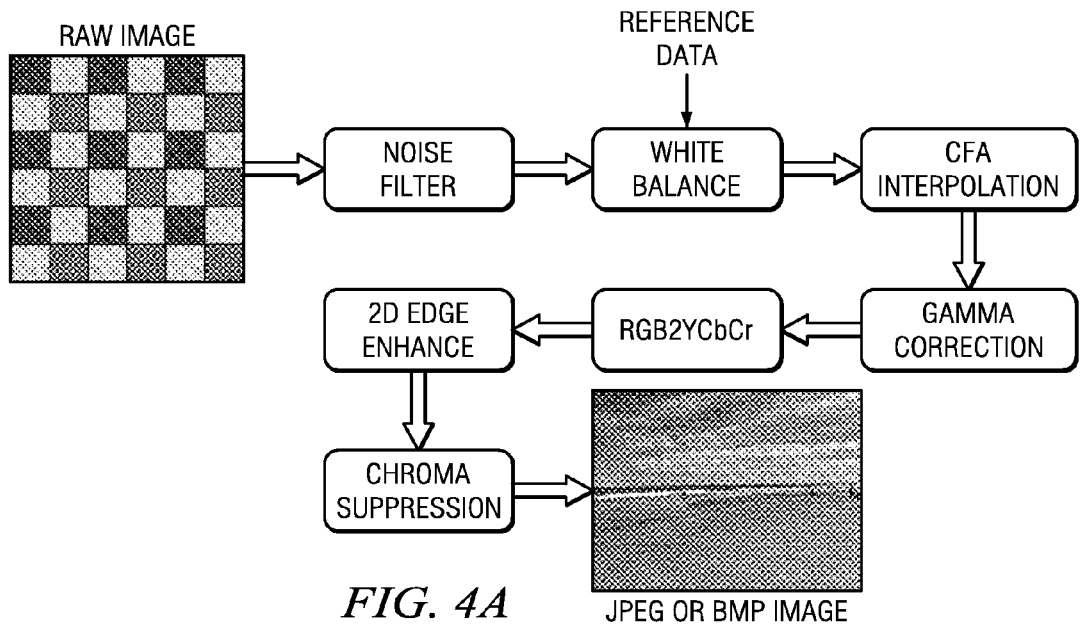
FIGS. 4A and 4B show block diagrams of a simulation system in accordance with one or more embodiments of the invention.
Figure 4B:
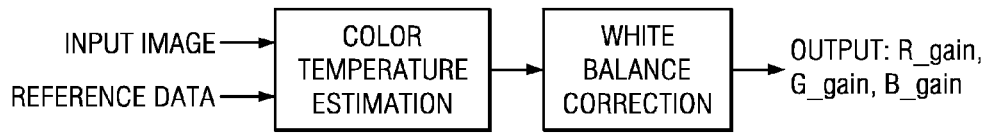

FIGS. 4A and 4B show block diagrams of a simulation system for automatic white balance calibration in accordance with one or more embodiments of the invention. In general, the simulation system simulates image pipeline processing. In some embodiments of the invention, the components of the simulation system shown in FIG. 4A simulate the functionality of image pipeline processing components in a target digital system (e.g., the digital systems of FIGS. 1, 10, and 11) to support tuning, testing, calibration, etc. of the various components using one or more test suites of digital images. In one or more embodiments of the invention, the components of the simulation system of FIG. 4A simulate functionality of similarly named components in the image pipeline of FIG. 2.

Further, in some embodiments of the invention, as shown in FIG. 4B, the white balance component of FIG. 4A simulates an automatic white balance method that includes color temperature estimation and white balance correction using reference data and the input image. Suitable methods for color temperature estimation and white balance correction are described in U.S. patent application Ser. No. 12/510,853. The outputs of the color temperature estimation and white balance correction include the gains (R_gain, G_gain, B_gain) to be applied to the color channels of the image to generate a white balanced image.

Figure 4C:
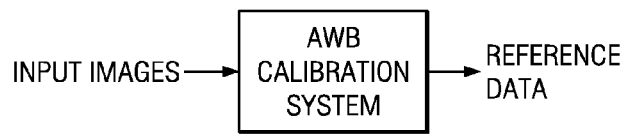
FIG. 4C shows a block diagram of an automatic white balance calibration system in accordance with one or more embodiments of the invention.

FIG. 4C is a block diagram of an AWB calibration system in accordance with one or more embodiments of the invention. In general, the AWB calibration system accepts input images of a test target captured with an imaging sensor at different color temperatures under simulated lighting conditions (e.g., using a light box) and/or natural lighting conditions, and/or input images of scene prototypes captured with the imaging sensor, and uses those images to generate reference data for calibrating AWB in a digital system having the same model of imaging sensor. The imaging sensor used to capture the input images may be a Golden Sample of the same model of imaging sensor to be used in the digital system. The reference data may include color temperature reference data generated from the test target images, and/or scene prototype reference data generated from the scene prototype images. The reference data may include image statistics for each input image and/or gray values for each input image. In some embodiments of the invention, the image statistics are histograms. Generation of references using a test target at different color temperatures under simulated lighting conditions is explained in more detail below in reference to FIG. 5A, generation of references using the test target in natural, i.e., outdoor, lighting conditions is explained in more detail below in reference to FIG. 5B, and generation of references using scene prototypes is explained in more detail in U.S. patent application Ser. No. 12/700,671.

Figure 5B:
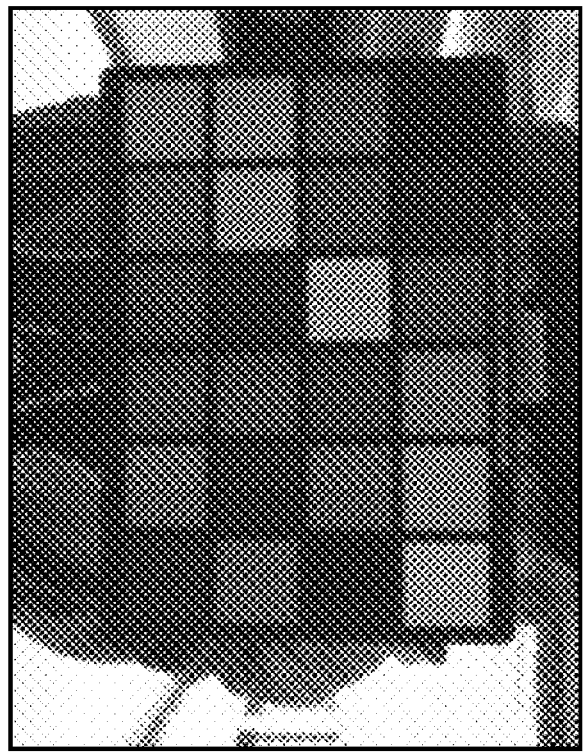
FIGS. 5A and 5B show example images for outdoor references in accordance with one or more embodiments of the invention.
Figure 5A:
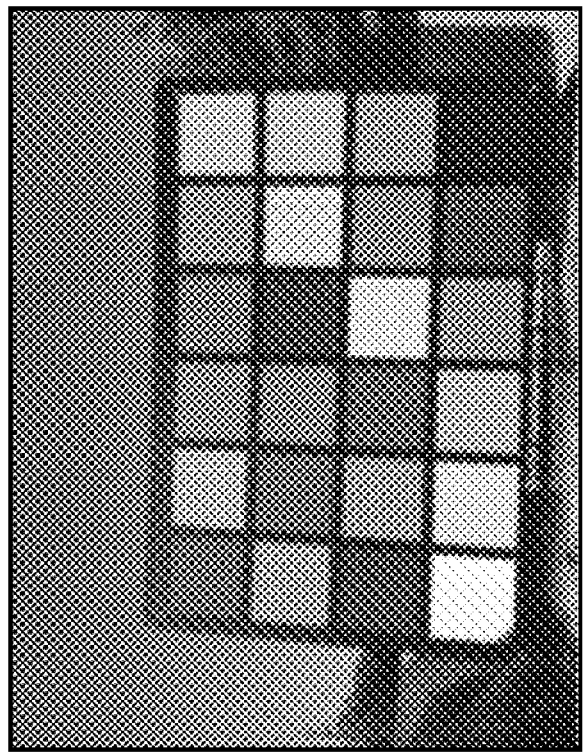

FIG. 5A is a flow graph of a method for calibration of automatic white balancing (AWB) in a digital system in accordance with one or more embodiments of the invention. In general, calibration of AWB is the generation of reference statistics (e.g., histograms, gray values, etc.) for a target imaging sensor. Initially, digital images of a test target (e.g., a color checker) are captured with an imaging sensor in a light box under controlled lighting conditions to capture images of the test target with different color temperatures (500). The color temperatures may include, for example, one or more of A (2800K), U30 (3000K), CWF (4200K), TL84 (4000K), D50 (5000K), D65 (6500K), and D75 (7500K). The imaging sensor used to capture the images may be a Golden Sample of the model of imaging sensor to be used in the digital system. The color checker, if used, may be any suitable photographic target that includes a range of common object colors, such as, for example, X-Rite ColorChecker Classic or an X-Rite ColorChecker Digital SG.

Then, statistics are generated for each of the test target images (504). In one or more embodiments of the invention, 2-D histograms of the test target images in the Cb-Cr space are computed. The histograms may be computed by quantizing the Cb into N (e.g., N=35) bins and Cr into M (e.g., M=32) bins, and counting the number of blocks or pixels falling into each Cr and Cb bin. In some embodiments of the invention, the images are downsampled before the histograms are generated.

In addition, the R, G, B, Cb and Cr values of one or more gray levels are extracted from gray patches in each of the test target images (502). The number of gray patches from which gray values are extracted may vary. For example, if the test target is a classic Macbeth color checker, there are six gray patches of different gray levels available. In one or more embodiments of the invention, the gray patches corresponding to the middle four gray levels are used, i.e., gray values are extracted from these four gray patches. The white patch is not used because of saturation issues and the black patch is not used because of large quantization errors.

In some embodiments of the invention, the R, G, B values for a gray patch are computed as the averages of the R, G, B values of pixels in the gray patch. In some embodiments of the invention, only a selected subset of the pixels (e.g., a center block of pixels in the gray patch) is used to compute the R, G, B values of the gray patch. Further, the Cb and Cr values for a gray patch are computed based on the R, G, B values. The Cb and Cr values may be computed as $$Y=0.299R+0.587G+0.114B$$

$$Cb=256(-0.1726R-0.3388G+0.5114B)/Y$$

$$Cr=256(0.5114R-0.4283G-0.0832B)/Y$$

The scale factors used in the above equations may be known industry standard scale factors for converting from R, G, B to Cb and Cr or may be empirically derived scale factors. In the above equations, Cb and Cr are normalized by Y. In other embodiments of the invention, Cb and Cr may be computed as shown above without normalization by Y.

The statistics and gray values for the images, i.e., the color temperature references, are then included in the set of reference data for AWB in the digital system (506).

FIG. 5B is a flow graph of a method for calibration of automatic white balancing (AWB) in a digital system in accordance with one or more embodiments of the invention. Initially, digital images of a test target (e.g., a color checker) are captured with the imaging sensor under natural, i.e., outdoor, lighting conditions (508). In some embodiments of the invention, the imaging sensor used to capture the images is a Golden Sample of the model of imaging sensor to be used in the digital system. The color checker, if used, may be any suitable photographic target that includes a range of common object colors, such as, for example, X-Rite ColorChecker Classic or an X-Rite ColorChecker Digital SG. In one or more embodiments of the invention, the test target used is the same test target as that used for generating color temperature references under simulated lighting conditions as previously described.

Figure 6A:
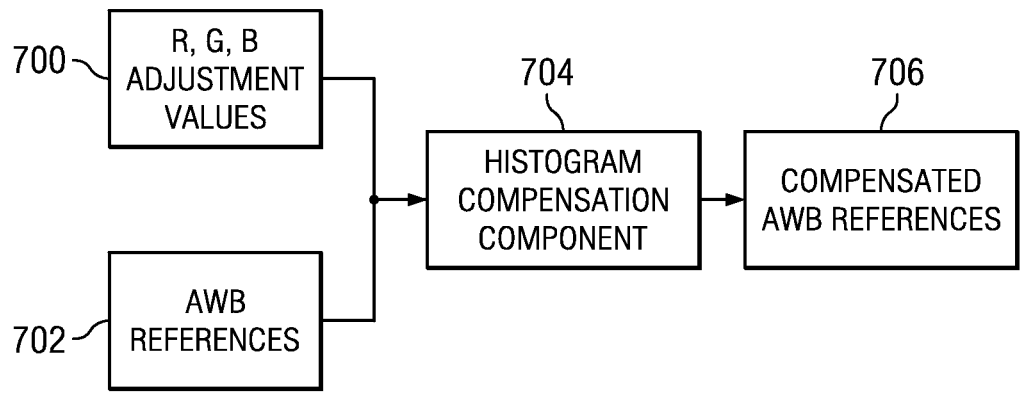
FIG. 6A is a block diagram of a histogram compensation system for automatic white balance calibration in accordance with one or more embodiments of the invention.
Figure 6B:
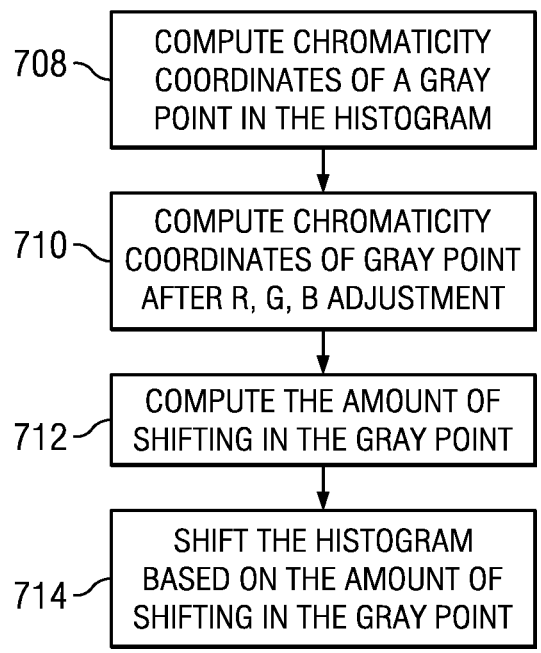
FIG. 6B is a flow graph of a method for histogram compensation for automatic white balance calibration in accordance with one or more embodiments of the invention.

In one or more embodiments of the invention, the outdoor lighting conditions may be outdoor sunny with clear sky (around 12 PM) and/or outdoor shade and/or outdoor cloudy. More specifically, a digital image of the test target may be captured with the imaging sensor under outdoor sunny conditions with a clear sky (around 12 PM) and care is taken to avoid casting shadows on the test target. An example of such a digital image is FIG. 6A. Alternatively, or in addition, a digital image of the test target may be captured with the imaging sensor in a shaded area under outdoor sunny conditions with a clear sky (around 12 PM) in which the test target is entirely covered in the shade. An example of such a digital image is shown in FIG. 6B. Alternatively, or in addition, a digital image of the test target may be captured with the imaging sensor under outdoor cloudy conditions.

Then, statistics are generated for each of the outdoor test target images (510). In one or more embodiments of the invention, 2-D histograms of the outdoor test target images in the Cb-Cr space are computed. The histograms may be computed by quantizing the Cb into N (e.g., N=35) bins and Cr into M (e.g., M=32) bins, and counting the number of blocks or pixels falling into each Cr and Cb bin. In some embodiments of the invention, the images are downsampled before the histograms are generated.

In addition, the R, G, B, Cb and Cr values of one or more gray levels are extracted from gray patches in each of the outdoor test target images (512). The number of gray patches from which gray values are extracted may vary. For example, if the test target is a classic Macbeth color checker, there are six gray patches of different gray color levels available. In one or more embodiments of the invention, the gray patches corresponding to the middle four gray levels are used, i.e., gray values are extracted from these four gray patches. The white patch is not used because of saturation issues and the black patch is not used because of large quantization errors.

In some embodiments of the invention, the R, G, B values for a gray patch are computed as the averages of the R, G, B values of pixels in the gray patch. In some embodiments of the invention, only a selected subset of the pixels (e.g., a center block of pixels in the gray patch) is used to compute the R, G, B values of the gray patch. Further, the Cb and Cr values for a gray patch are computed based on the R, G, B values. The Cb and Cr values may be computed as $$Y=0.299R+0.587G+0.114B$$

$$Cb=256(-0.1726R-0.3388G+0.5114B)/Y$$

$$Cr=256(0.5114R-0.4283G-0.0832B)/Y$$

The scale factors used in the above equations may be known industry standard scale factors for converting from R, G, B to Cb and Cr or may be empirically derived scale factors. In the above equations, Cb and Cr are normalized by Y. In other embodiments of the invention, Cb and Cr may be computed as shown above without normalization by Y.

The statistics and gray values for the outdoor test target images (e.g., the outdoor sunny reference, the outdoor shade reference, and/or the outdoor cloudy reference) are then included in the set of reference data for AWB in the digital system (514).

In one or more embodiments of the invention, simulated lighting references generated from test target images captured at different color temperatures under simulated lighting conditions and natural lighting references generated form test target images captured at different color temperatures under natural lighting conditions are combined as the color temperature references for use in AWB calibration. The inclusion of the natural lighting references significantly improves AWB accuracy for outdoor scenes. For example, adding the natural lighting references gives more weight to the higher color temperature references (D50 and higher). Without these references, there may be, for example, three references (D75, D65 and D50) for outdoor sunny/cloudy scenes. With the addition of outdoor sunny and outdoor shade references, there are five references for such scenes. Since each reference is given equal weight in the AWB method, increasing the number of higher color temperature references is equivalent to giving the higher color temperature references more weight. This strategy serves the outdoor scenes very well, without degrading indoor scenes.

Figure 7:
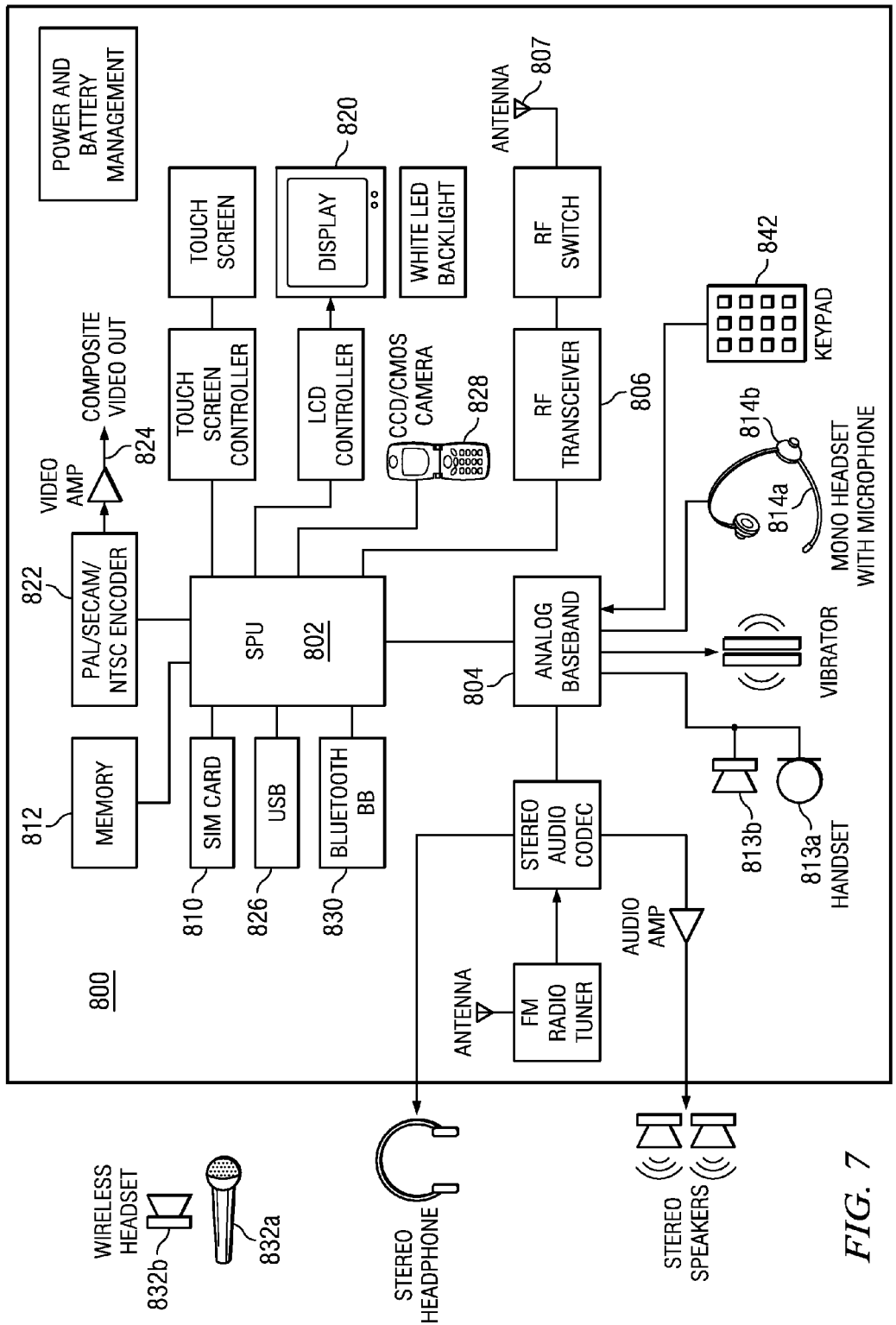
FIGS. 7 and 8 show block diagrams of digital systems in accordance with one or more embodiments of the invention.

FIG. 7A is a block diagram of a histogram compensation system for AWB calibration in accordance with one or more embodiments of the invention. In general, the histogram compensation system adjusts histograms in AWB references generated using an imaging sensor (e.g., a Golden Sample) into histograms for AWB references for another imaging sensor of the same model based on R, G, B adjustment values that represent R, G, B differences between the two imaging sensors. As shown in FIG. 7A, R, G, B adjustment amounts (700) and AWB references (702) are provided to a histogram compensation component (704). The AWB references (702) are references generated as described herein and include histograms and one or more gray values. The R, G, B adjustment amounts are values that are determined by measuring gray values from the imaging sensor used when generating the AWB references (i.e., the original sensor) and gray values from the imaging sensor for which the AWB references are being compensated (i.e., the target imaging sensor) under one or more color temperatures and finding the difference (e.g., ratio) between the R, G, B values of the original imaging sensor and the target imaging sensor. These R, G, B values may be provided by the manufacturer of the imaging sensors.

The histogram compensation component (704) used the R, G, B adjustment values to adjust the histograms in the AWB references generated using the original imaging sensor for use with the target imaging sensor. A method for compensating the histograms of the AWB references is described herein in reference to FIG. 7B. The output of the histogram compensation component (704) is compensated AWB references, i.e., AWB references with compensated histograms (706), that may be used by AWB in a digital system that incorporates the target imaging sensor. In one or more embodiments of the invention, the histogram compensation component (704) is included in the digital system and is used to compensate the AWB references prior to the initial use of AWB in the digital system after the digital system is activated (e.g., each time a digital camera is turned on). In such embodiments, the AWB references generated using the original imaging sensor and the R, G, B adjustment values are stored in the digital system.

In some embodiments of the invention, the histogram compensation component may be included in an AWB calibration system (e.g., the AWB calibration system of FIG. 4C). In such embodiments, once the AWB references are generated using the original imaging sensor, they may be input to the histogram compensation component along with R, G, B adjustment values for one or more target imaging sensors to generate compensated AWB references for the one or more target imaging sensors. In some embodiments of the invention, the histogram compensation system is a system separate from the digital system incorporating the target imaging sensor and the AWB calibration system.

FIG. 7B is a flow diagram of a method for histogram compensation for automatic white balance calibration in a digital system in accordance with one or more embodiments of the invention. This method is performed for each histogram in each AWB reference that is to be adjusted from a histogram generated using a particular model of imaging sensor (e.g., a Golden Sample) to a histogram for a target imaging sensor of the same model that is to be used in the digital system. In general, the method adjusts the 2-D chromaticity histogram of the original AWB reference based on R, G, B adjustment values, referred to herein as Kr, Kg, and Kb, for the target imaging sensor to generate a compensated histogram for the target imaging sensor. The values of Kr, Kg, and Kb represent the respective R, G, B differences between the two imaging sensors. As was previously explained, the 2-D chromaticity histogram is generated by first transforming image data from R, G, B space into Cb, and Cr space and then computing the histogram of the image in Cb and Cr space. Because the histogram does not directly represent the R, G, B data of the image, adjusting the histogram using the R, G, B adjustment values is not straightforward.

As shown in FIG. 7B, initially, the chromaticity coordinates of a gray point in the histogram of the original AWB reference are computed (708). The gray points in the R, G, B space are the pixels with equal amount of R, G, and B. Hence, in the Cb/Cr chromaticity space, these gray points all correspond to the point [0, 0], that is, Cr is zero and Cb is zero. In the 2-D histogram, the coordinates of a pixel with chromaticity [input_Cr, input_Cb] in the Cr/Cb space may be computed as shown in the pseudo code of Table 1.

This pseudo code computes the Cb class (bin number in Cb) and Cr class (bin number in Cr) in the 2-D chromaticity histogram, for input Cb and Cr chromaticity values: [input_Cr, input_Cb]. The variables min_Cb, max_Cb, min_Cr, and max_Cr are the boundaries of the Cr/CB chromaticity space, i.e., they are the range of the available Cr and Cb values. The value of delta is determined empirically. In one or more embodiments of the invention, min_Cb=−130, max_Cb=200, min_Cr=−100, max_Cr=200, and delta=10. The output of the pseudo code is the coordinates of the pixel in the 2-D chromaticity histogram: [input_Cr_class, input_Cb_class]. Therefore, the chromaticity coordinates of the gray point in the 2-D histogram may be computed by setting input_Cb and input_Cr to 0 in the pseudo code. In one or more embodiments of the invention, assuming the values for min_Cb, max_Cb, min_Cr, max_Cr, and delta as given above, the coordinates of the gray point, input_Cb_class and input_Cr_class, as computed by the pseudo code are, respectively, floor (130/10)+2 and floor (100/10)+2. The computed chromaticity coordinates of the gray point are referred to as old_center_Cr_class and old_center_Cb_class below.

TABLE 1

```
if(input_Cb < min_Cb)
    input_Cb_class = 1;
elseif(input_Cb >= max_Cb)
    input_Cb_class = max_Cb_class;
else
    input_Cb_class = floor((input_Cb−min_Cb)/delta)+2;
end
if(input_Cr < min_Cr)
    input_Cr_class = 1;
elseif(input_Cr >= max_Cr)
    input_Cr_class = max_Cr_class;
else
    input_Cr_class = floor((input_Cr−min_Cr)/delta)+2;
end
```

Next, the chromaticity coordinates of the gray point after R, G, B adjustment are computed (710). The relationship of the R, G, B values before and after R, G, B adjustment may be represented as $R\_new = Kr \cdot R\_old$ $G\_new = Kg \cdot G\_old$ $B\_new = Kb \cdot B\_old$ The chromaticity coordinates of the gray point in R, G, B space [T, T, T] become [Kr*T, Kg*T, Kb*T] with the application of the adjustment values. The corresponding Cb and Cr values may then be computed by $Y = 0.299R + 0.587G + 0.114B$ $Cb = 256(-0.1726R - 0.3388G + 0.5114B)/Y$ $Cr = 256(0.5114R - 0.4283G - 0.0832B)/Y$ The scale factors used in the above equations may be known industry standard scale factors for converting from R, G, B to Cb and Cr or may be empirically derived scale factors. In the above equations, Cb and Cr are normalized by Y. In other embodiments of the invention, Cb and Cr may be computed as shown above without normalization by Y.

The Cb and Cr values for [Kr*T, Kg*T, Kb*T], denoted as new_center_Cb and new_center_Cr, may then be computed by $$\text{new\_center\_Cb} = \frac{256(-0.1726Kr - 0.3388Kg + 0.5114Kb)}{0.299Kr + 0.587Kg + 0.114Kb}$$

$$\text{new\_center\_Cr} = \frac{256(0.5114R - 0.4283G - 0.0832B)}{0.299Kr + 0.587Kg + 0.114Kb}$$

Finally, the chromaticity coordinates of the adjusted gray point in the 2-D chromaticity histogram may be computed by letting input_Cb equal new_center_Cb and input_Cr equal new_center_Cr, respectively, in the pseudo code of Table 1. The computed chromaticity coordinates are referred to as new_center_Cr_class and new_center_Cb_class below.

Once the chromaticity coordinates of the gray point after R, G, B adjustment are computed, the amount of shifting in the gray point resulting from the R, G, B adjustment is computed (712). The amount of shifting for each chromaticity coordinate may be computed as delta_Cb_class=new_center_Cb_class−old_center_Cb_class delta_Cr_class=new_center_Cr_class−old_center_Cr_class Finally, the histogram is shifted based on the amount of shifting computed for the gray point (714). More specifically, an adjustment operation is performed on each Cb class and Cr class (i.e., each Cb bin and each Cr bin) in the histogram, denoted as $\text{Hist}_{old}$ below, to generate an adjusted histogram, denoted as $\text{Hist}_{new}$ below. The adjustment operation is defined as $\text{Hist}_{new}(Cr\_class, Cb\_class) = \text{Hist}_{old}(Cr\_class + \text{delta}\_Cr\_class, Cb\_class + \text{delta}\_Cb\_class)$ The adjusted, i.e., compensated, histogram may then be used for AWB in the digital system. In one or more embodiments of the invention, the histogram compensation method may be performed in the digital system to compensate the AWB references prior to the initial use of AWB in the digital system after the digital system is activated (e.g., each time a digital camera is turned on). In such embodiments, the AWB references generated using the original imaging sensor and the R, G, B adjustment values are stored in the digital system. In some embodiments of the invention, the histogram compensation method may be implemented in an AWB calibration system (e.g., the AWB calibration system of FIG. 4C). In such embodiments, once the AWB references are generated using the original imaging sensor, they may be processed with the histogram compensation method to generate compensated AWB references for one or more target imaging sensors. In some embodiments of the invention, the histogram compensation method may be performed on a system separate from the digital system incorporating the target imaging sensor and the AWB calibration system.

Embodiments of the methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing including embodiments of the methods for image noise filtering described herein. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

Embodiments of methods described herein may be implemented in hardware, software, firmware, or any combination thereof. If implemented at least partially in software, the software may be executed in one or more processors, such as a microprocessor, application specific integrated circuit (ASIC), field programmable gate array (FPGA), or digital signal processor (DSP). Software embodying the methods may be initially stored in a computer-readable medium (e.g., memory, flash memory, a DVD, USB key, etc.) and loaded and executed by a processor. Further, the computer-readable medium may be accessed over a network or other communication path for downloading the software. In some cases, the software may also be provided in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 8:
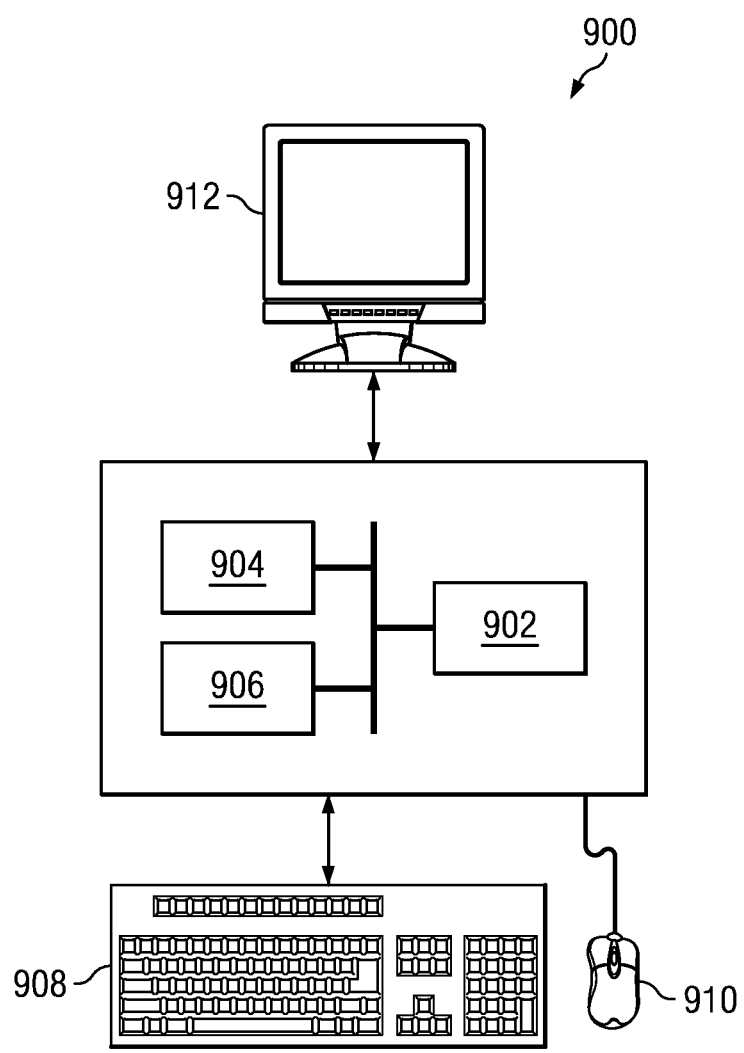

Embodiments of the AWB methods and histogram compensation methods as described herein may be implemented for virtually any type of digital system (e.g., a desk top computer, a laptop computer, a handheld device such as a mobile (i.e., cellular) phone, a personal digital assistant, a digital camera, etc.) with functionality to capture digital image data using an imaging sensor. FIGS. 8 and 9 show block diagrams of illustrative digital systems.

FIG. 8 is a block diagram of a digital system (e.g., a mobile cellular telephone) (800) that may be configured to perform the methods described herein. The signal processing unit (SPU) (802) includes a digital signal processor system (DSP) that includes embedded memory and security features. The analog baseband unit (804) receives a voice data stream from handset microphone (813a) and sends a voice data stream to the handset mono speaker (813b). The analog baseband unit (804) also receives a voice data stream from the microphone (814a) and sends a voice data stream to the mono headset (814b). The analog baseband unit (804) and the SPU (802) may be separate integrated circuits. In many embodiments, the analog baseband unit (804) does not embed a programmable processor core, but performs processing based on configuration of audio paths, filters, gains, etc. being setup by software running on the SPU (802). In some embodiments, the analog baseband processing is performed on the same processor and can send information to it for interaction with a user of the digital system (800) during a call processing or other processing.

The display (820) may also display pictures and video streams received from the network, from a local camera (828), or from other sources such as the USB (826) or the memory (812). The SPU (802) may also send a video stream to the display (820) that is received from various sources such as the cellular network via the RF transceiver (806) or the camera (826). The SPU (802) may also send a video stream to an external video display unit via the encoder (822) over a composite output terminal (824). The encoder unit (822) may provide encoding according to PAL/SECAM/NTSC video standards.

The SPU (802) includes functionality to perform the computational operations required for video encoding and decoding. The video encoding standards supported may include, for example, one or more of the JPEG standards, the MPEG standards, and the H.26x standards. In one or more embodiments of the invention, the SPU (802) is configured to perform the computational operations of an AWB method as described herein. In one or more embodiments of the invention, the SPU (802) is also configured to perform the computational operations of a histogram compensation method as described herein. Software instructions implementing the method(s) may be stored in the memory (812) and executed by the SPU (802) as part of capturing digital image data, e.g., pictures and video streams.

FIG. 9 shows a digital system (900) (e.g., a personal computer) that includes a processor (902), associated memory (904), a storage device (906), and numerous other elements and functionalities typical of digital systems (not shown). In one or more embodiments of the invention, a digital system may include multiple processors and/or one or more of the processors may be digital signal processors. The digital system (900) may also include input means, such as a keyboard (908) and a mouse (910) (or other cursor control device), and output means, such as a monitor (912) (or other display device). The digital system (900) may also include an image capture device (not shown) that includes circuitry (e.g., optics, a sensor, readout electronics) for capturing still images and/or video sequences. The digital system (900) may include functionality to perform embodiments of the methods as described herein. The digital system (900) may be connected to a network (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (900) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (900) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. It is therefore contemplated that the appended claims will cover any such modifications of the embodiments as fall within the true scope and spirit of the invention.

What is claimed is:

1. A method for calibrating automatic white balance (AWB) in a digital system, the method comprising:
   capturing an image of a test target under a natural lighting condition;
   generating a first color temperature reference from the captured image; and
   outputting AWB configuration data for the digital system, wherein the AWB configuration data comprises the first color temperature reference and a second color temperature reference generated using the test target under simulated lighting conditions, wherein the one or more first color histogram reference and the one or more second color histogram reference are adjusted to compensate for the difference in characteristics of another sensor and wherein compensating histograms comprises:
   computing first chromaticity coordinates of a gray point in a histogram of the second references;
   computing second chromaticity coordinates of the gray point based on the R, G, B adjustment values;
   computing an amount of shifting between the first chromaticity coordinates and the second chromaticity coordinates; and
   shifting the histogram of the second references by the amount of shifting to generate a histogram of the first references.

2. The method of claim 1, wherein the natural lighting condition is one selected from a group consisting of outdoor sunny with clear sky, outdoor shade under sunny conditions with a clear sky, and outdoor with a cloudy sky.

3. The method of claim 1, wherein generating a first color temperature reference comprises:
   generating statistics of the captured image; and
   extracting gray values from gray patches in the test target in the captured image.

4. The method of claim 3, wherein generating statistics comprises generating a histogram of the captured image in a chromaticity space.

5. The method of claim 1, wherein the AWB configuration data further comprises a scene prototype reference.

6. The method of claim 5, wherein the second color temperature reference is generated by
   capturing an image of the test target at a color temperature in a light box to generate a color temperature image;
   generating statistics of the color temperature image; and
   extracting gray values from gray patches in the test target in the color temperature image.

7. A method for calibrating automatic white balance (AWB) in a digital system comprising a first imaging sensor, the method comprising:
   receiving a reference for AWB that was generated using an image captured using a second imaging sensor; and
   compensating a histogram of the reference into a histogram for AWB in the digital system based on R, G, B adjustment values for the first imaging sensor, wherein a first references and a second references are adjusted to compensate for the difference in characteristics of another sensor and wherein compensating histograms comprises:
   computing first chromaticity coordinates of a gray point in a histogram of the second references;
   computing second chromaticity coordinates of the gray point based on the R, G, B adjustment values;
   computing an amount of shifting between the first chromaticity coordinates and the second chromaticity coordinates; and
   shifting the histogram of the second references by the amount of shifting to generate a histogram of the first references.

8. The method of claim 7, wherein receiving a reference and compensating a histogram are performed in the digital system.

9. The method of claim 7, further comprising outputting AWB configuration data for the digital system, wherein the AWB configuration data comprises the histogram for AWB.

10. A digital system comprising:
    a processor;
    a first imaging sensor; and
    an automatic white balance (AWB) component, wherein the automatic white balance component is operable to use first references to white balance a digital image captured using the first imaging sensor, and wherein the first references were generated by compensating histograms of second references into histograms for the first references based on R, G, B adjustment values for the first imaging sensor, and wherein the second references were generated using images captured by a second imaging sensor, wherein the first references and the second references are adjusted to compensate for the difference in characteristics of another sensor and wherein compensating histograms comprises:
    computing first chromaticity coordinates of a gray point in a histogram of the second references;
    computing second chromaticity coordinates of the gray point based on the R, G, B adjustment values;
    computing an amount of shifting between the first chromaticity coordinates and the second chromaticity coordinates; and
    shifting the histogram of the second references by the amount of shifting to generate a histogram of the first references.

11. The digital system of claim 10, further comprising a histogram compensation component, wherein the histogram compensation component performs the compensating histograms of second references.

12. The digital system of claim 10, wherein the second references comprise a color temperature reference generated using an image of a test target captured under a natural lighting condition using the second imaging sensor.

13. The digital system of claim 12, wherein the color temperature reference is generated by:
    generating statistics of the captured test target image; and
    extracting gray values from gray patches in the test target, wherein the natural lighting condition is one selected from a group consisting of outdoor sunny with clear sky, outdoor shade under sunny conditions with a clear sky, and outdoor with a cloudy sky.

14. The digital system of claim 13, wherein generating statistics comprises generating a histogram of the captured image in a chromaticity space.

15. The digital system of claim 10, wherein the second references comprise at least one selected from a group consisting of a scene prototype reference and a color temperature reference.

* * * * *